No. 848,306. PATENTED MAR. 26, 1907.
L. E. HULL.
FARM IMPLEMENT.
APPLICATION FILED MAR. 17, 1906.

2 SHEETS—SHEET 1.

WITNESSES:
C. K. Reichenbach.
T. C. Jones

INVENTOR
L. E. Hull.
BY Chandler & Chandler
Attorneys.

No. 848,306. PATENTED MAR. 26, 1907.
L. E. HULL.
FARM IMPLEMENT.
APPLICATION FILED MAR. 17, 1906.
2 SHEETS—SHEET 2.
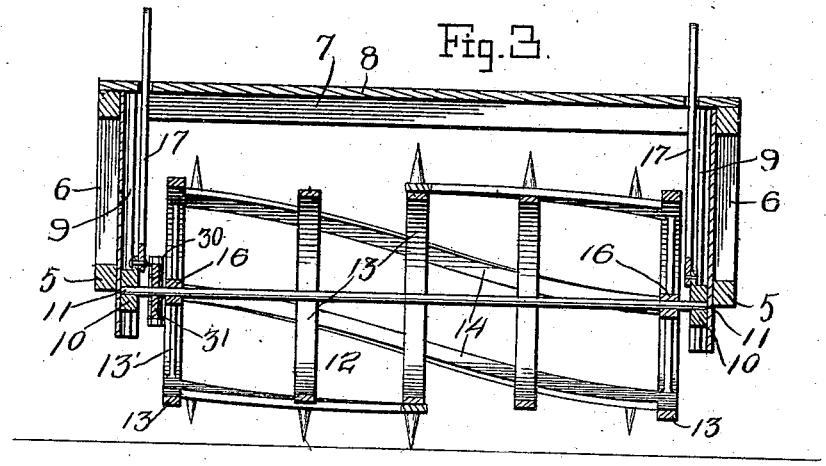
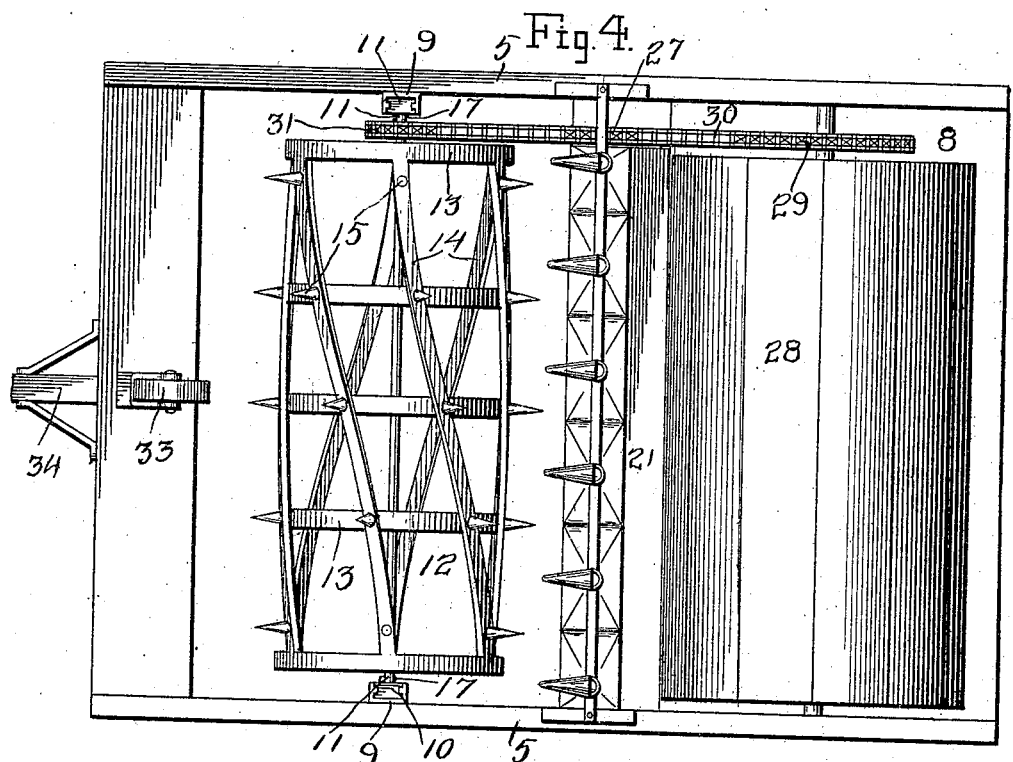
WITNESSES:
C. K. Reichenbach.
J. C. Jones
INVENTOR
L. E. Hull
BY
Attorneys.

UNITED STATES PATENT OFFICE.

LYCURGUS E. HULL, OF GREAT FALLS, MONTANA.

FARM IMPLEMENT.

No. 848,306.     Specification of Letters Patent.     Patented March 26, 1907.

Application filed March 17, 1906. Serial No. 306,667.

*To all whom it may concern:*

Be it known that I, LYCURGUS E. HULL, a citizen of the United States, residing at Great Falls, in the county of Cascade, State of Montana, have invented certain new and useful Improvements in Farm Implements; and I do hereby declare the following to be a full, clear, and exact description of the invention, such as will enable others skilled in the art to which it appertains to make and use the same.

This invention relates to farm implements, and more particularly to planters, and has for its object to provide an implement of this kind which will include seed-discharging means, ground-treating means located forwardly of the seeding means to prepare the earth for the reception of seeds, and a roller located rearwardly of the seeding means, the arrangement being such that motion is transmitted to the seeding and forward ground-treating means from the roller through the medium of a single chain. Other objects and advantages will be apparent from the following description.

Figure 1:
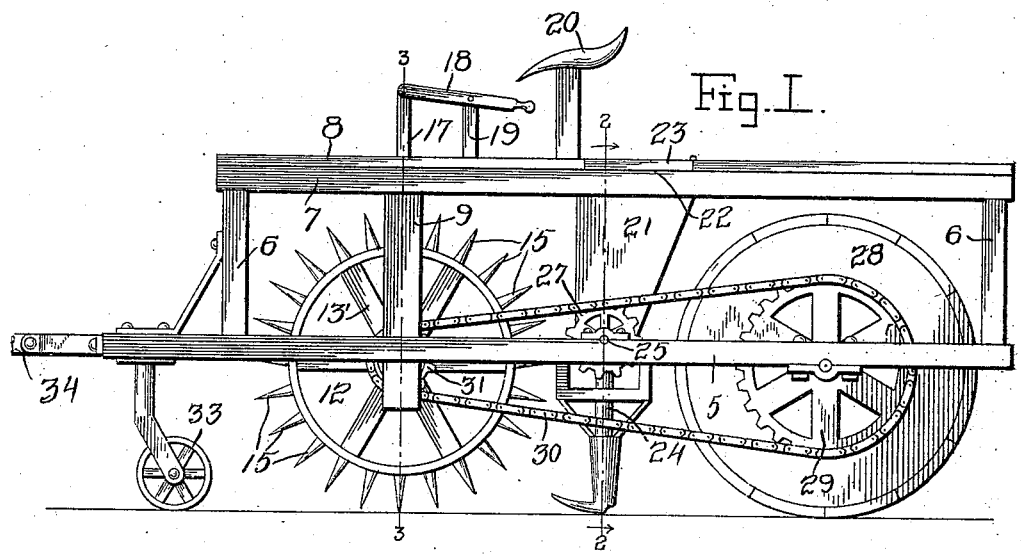
Figure 2:
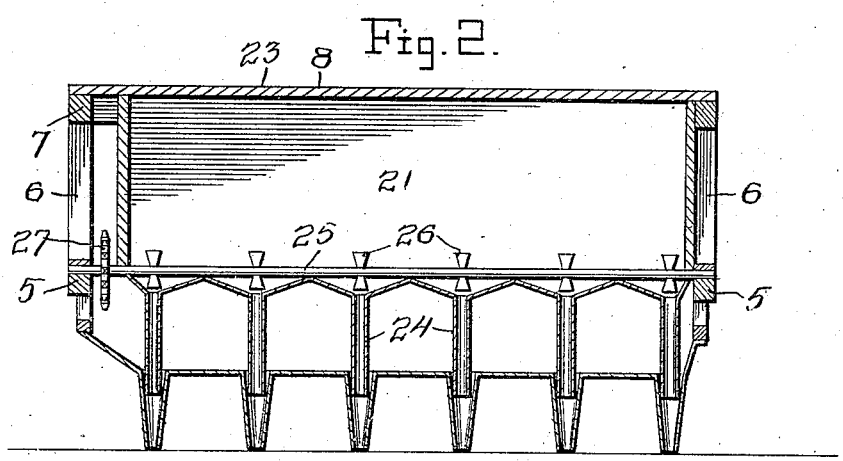

In the drawings forming a portion of this specification, and in which like numerals of reference indicate similar parts in the several views, Figure 1 is a side elevation of the present implement. Fig. 2 is a vertical section on line 2 2 of Fig. 1, taken through the seeding mechanism. Fig. 3 is a vertical section on line 3 3 of Fig. 1, taken through the harrow-roller and showing the mounting thereof to permit of vertical movement; and Fig. 4 is a bottom plan view.

Referring now to the drawings, the present invention comprises spaced longitudinal sills 5, adjacent to the forward and rearward ends of which there are secured uprights 6, having a frame 7 mounted thereupon, which carries a platform 8. Secured to the frame 7 and to the sills 5 at the forward portions thereof there are vertical guide members 9, in which there are engaged for vertical movement a pair of pillow-blocks 10, in which are revolubly engaged the trunnions 11 of a skeleton harrow-roller 12. This roller includes a plurality of circular bands 13, to which are secured longitudinally-extending diagonal plates 14, carrying radial teeth 15, the outermost bands 13 being connected, by means of spokes 13', with hubs 16, which carry the trunnions 11. It will thus be seen that the teeth 15 are brought into engagement with the ground successively as the roller is revolved.

The pillow-blocks 10 have an upwardly-extending yoke 17, secured thereto, which extends upwardly through the platform 8 and is pivotally connected with a lever 18, mounted in a support 19 upon the platform and lying within the reach of an occupant of a seat 20, the arrangement being such that operation of the lever 18 results in vertical movement of the roller.

Secured to the frame 7 and extending downwardly between the sills 5 there is a hopper 21, lying beneath an opening 22 in the platform 8, this opening being provided with a door 23, which thus closes the top of the hopper.

Discharge-chutes 24 are connected with the lower end of the hopper, and a transverse shaft 25 is journaled in the hopper and carries agitating-fingers 26. This shaft has its ends journaled in boxings upon the sills 5, and it carries a sprocket-wheel 27, lying between the hopper and one of the sills. Journaled transversely between the sills 5 and rearwardly of the seeding mechanism there is a presser-roller 28, having a sprocket-wheel 29, and engaged with this sprocket-wheel there is an endless chain 30, which is also engaged with the sprocket-wheel 31, carried by the corresponding end of the harrow-roller 12. The chain also passes over and is engaged by the teeth of the sprocket-wheel 27 for rotation of the latter. It will thus be seen that as the implement moves over the ground the several portions thereof will be simultaneously operated. A caster-wheel 33 is located at the forward end of the implement, and the implement is also provided with a draft-tongue 34.

It will be observed that by reason of the fact that the harrow-roller is movable independently of the seeding mechanism when the harrow-roller is moved upwardly the chain 30 will be brought out of engagement with the sprocket 27 of the seeding mechanism, so that the seeding mechanism will operate only when the harrow-roller is in engagement with the ground. It will of course be understood that within certain limits the harrow-roller may be adjusted without disengaging the chain from the sprocket 27.

What is claimed is—

1. In an implement of the class described, the combination with sills, of a seeding mechanism located between the sills, a sprocket-wheel carried by the seeding mechanism for operation thereof, a harrow-roller mounted revolubly between the sills for vertical movement independently of the seeding mechanism, a sprocket-wheel carried by the harrow-roller, a presser-roller journaled between the sills rearwardly of the seeding mechanism, a sprocket-wheel carried by the presser-roller, a single chain engaged with the three sprocket-wheels for simultaneous operation thereof, and means for moving the harrow-roller vertically to bring the chain into and out of engagement with the sprocket of the seeding mechanism.

2. In an implement of the class described, the combination with spaced sills, of vertical guide members secured to the sills, pillow-blocks slidably mounted in the guide members, a harrow-roller having trunnions journaled in the pillow-blocks, a yoke connected with the pillow-blocks, a frame mounted above the sills, a lever pivotally connected with the frame and with the yoke, a seeding mechanism located rearwardly of the harrow-roller and including an operating-shaft, a sprocket for the operating-shaft, a presser-roller journaled between the sills rearwardly of the seeding mechanism, sprockets carried by the harrow and presser rollers, and a chain engaged with the sprockets of the rollers and arranged for movement into and out of engagement with the sprocket of the seeding mechanism when the harrow-roller is moved vertically.

In testimony whereof I affix my signature in presence of two witnesses.

LYCURGUS E. HULL.

Witnesses:
JOHN W. STANTON,
N. DALY.